United States Patent
Yamazaki et al.

(10) Patent No.: US 6,611,422 B2
(45) Date of Patent: Aug. 26, 2003

(54) ELECTRODE FOIL FOR ALUMINUM ELECTROLYTIC CAPACITOR AND METHOD OF MANUFACTURING SAME

(75) Inventors: Nobuhiko Yamazaki, Katano (JP); Kazuaki Nakanishi, Katano (JP); Shinichi Yamaguchi, Kyoto (JP); Hisao Ohishi, Uji (JP); Ryoichi Shimatani, Kyotanabe (JP); Akihiro Yamaguchi, Ikoma-gun (JP); Kazuko Hasegawa, Uji (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/234,467

(22) Filed: Sep. 5, 2002

(65) Prior Publication Data

US 2003/0007312 A1 Jan. 9, 2003

Related U.S. Application Data

(62) Division of application No. 10/073,860, filed on Feb. 14, 2002, now abandoned.

(30) Foreign Application Priority Data

Feb. 14, 2001 (JP) .......................................... 2001-36544
Feb. 28, 2001 (JP) .......................................... 2001-53994

(51) Int. Cl.$^7$ ............................ H01G 9/04; H01G 9/042
(52) U.S. Cl. ...................... 361/508; 361/509; 361/528; 361/529

(58) Field of Search ................................ 361/502, 508, 361/509, 528, 529; 29/25.03; 205/153, 214, 660

(56) References Cited

U.S. PATENT DOCUMENTS

| | | | | |
|---|---|---|---|---|
| 3,884,783 A | * | 5/1975 | Austin | 205/660 |
| 4,368,503 A | | 1/1983 | Kurosawa et al. | |
| 4,455,200 A | * | 6/1984 | Okamoto | 205/214 |
| 4,840,713 A | * | 6/1989 | Pliefke | 205/153 |
| 4,888,666 A | | 12/1989 | Naitoh et al. | 361/512 |
| 5,143,587 A | * | 9/1992 | Endoh et al. | 361/504 |
| 6,327,134 B1 | | 12/2001 | Kuroda et al. | 361/303 |
| 6,493,210 B2 | * | 12/2002 | Nanaka et al. | 361/502 |

* cited by examiner

*Primary Examiner*—Anthony Dinkins
(74) *Attorney, Agent, or Firm*—Parkhurst & Wendel, L.L.P.

(57) ABSTRACT

Sub pits are suppressed from branching in a surface layer of an aluminum foil, and an electrode foil for an aluminum electrolytic capacitor with a large electrostatic capacitance and a method of manufacturing the same are provided. A large number of main pits are formed by etching on both surfaces of the aluminum foil to extend from the surfaces in a thickness direction of the foil, sub pits are formed to branch away from the main pits for a range from a vicinity of a surface layer portion of each main pits excluding the surface layer portion, to inner ends of the main pits. Since the sub pits are not formed in the surface layer of the aluminum foil, the sub pits can be increased in density effectively to the electrostatic capacitance, allowing the electrode foil for the aluminum electrolytic capacitor to have high mechanical strength and high electrostatic capacitance.

9 Claims, 9 Drawing Sheets

F I G. 9
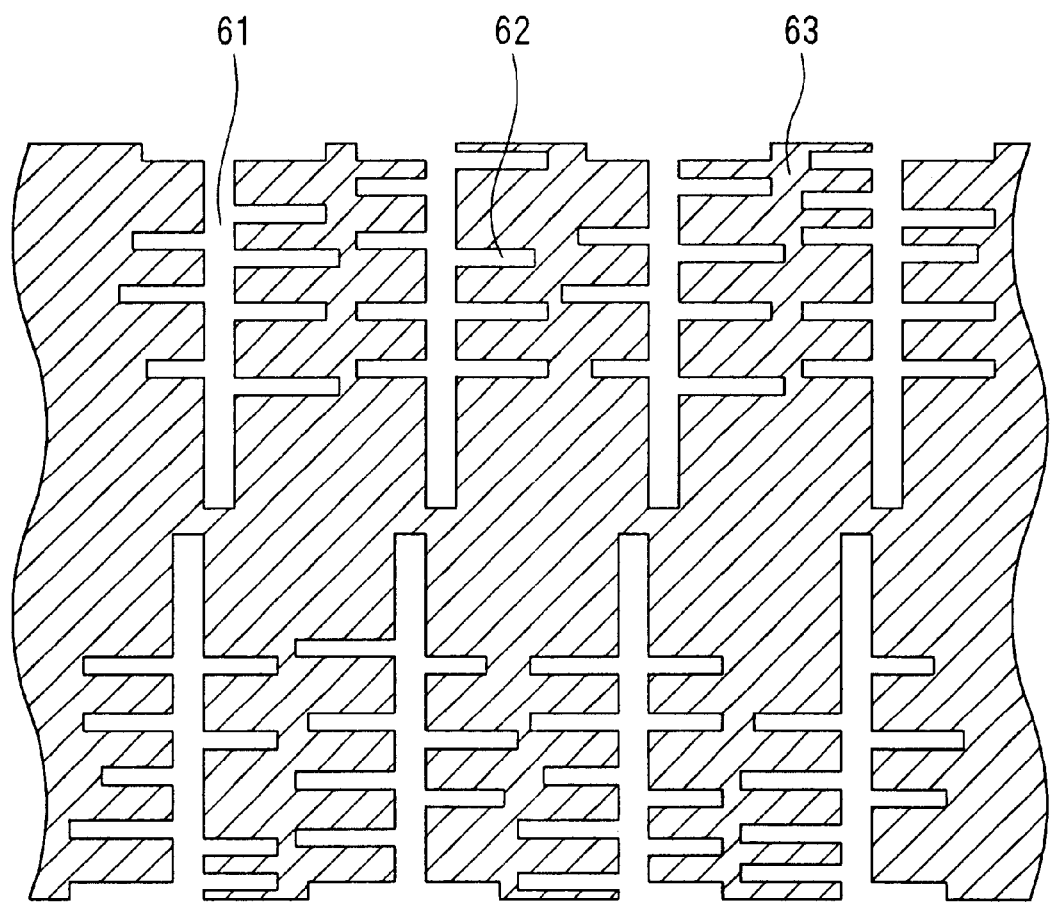

ELECTRODE FOIL FOR ALUMINUM ELECTROLYTIC CAPACITOR AND METHOD OF MANUFACTURING SAME

This application is a divisional of application Ser. No. 10/073,860 filed Feb. 14, 2002, now abandoned.

FIELD OF THE INVENTION

The present invention relates to an electrode foil used for an aluminum electrolytic capacitor, and particularly concerns an electrode foil for an aluminum electrolytic capacitor for a high and medium voltage and a method of manufacturing the same.

BACKGROUND OF THE INVENTION

In recent years, as electronic equipment has become smaller with higher reliability, users have strongly demanded smaller aluminum electrolytic capacitors. Thus, electrode foil used for aluminum electrolytic capacitors needs to be larger in electrostatic capacitance per unit area than the conventional art.

A typical aluminum electrolytic capacitor is configured such that a capacitor element is composed of an anode foil and a cathode foil that are wound via a separator, the capacitor element is dipped into an electrolytic solution for driving, and the capacitor element is sealed into a metallic case. The anode foil has a dielectric oxide film formed by performing anodic oxidation on a surface of aluminum foil, which has an effective surface area increased by etching. The cathode foil includes aluminum foil whose effective surface area is increased by etching.

Regarding such an aluminum electrolytic capacitor, in order to have a larger electrostatic capacitance or a smaller size, it has been necessary to increase an effective surface area of the anode foil and an electrostatic capacitance per unit area. Thus, etching technique for increasing the effective surface area of the anode foil has been developed in earnest.

The above method of etching the anode foil is performed chemically or electrochemically in a solution of hydrochloric acid, in which acid such as sulfuric acid, nitric acid, phosphoric acid, and oxalic acid for forming a film is added. A method of etching the anode foil used for a medium and high voltage basically includes a first etching step of generating main pits and a final etching step of increasing the main pits in a diameter suitable for a used voltage of an aluminum electrolytic capacitor. An important point is how to generate a large number of main pits and to efficiently increase the main pits in size.

For example, as disclosed in JP7-272983A, a technique for increasing an effective surface area of the anode foil includes a first etching step of electrochemically performing etching using a direct current in a solution of hydrochloric acid or the like, an middle etching step of performing etching using a direct current in a solution of neutral salt such as sodium chloride, and a final etching step of performing electrical etching in a solution of nitric acid, sulfuric acid, or mixed acid thereof. With the above manufacturing method, a large number of main pits can be formed from a surface and an effective surface area on aluminum foil can be increased by forming branched sub pits at the midpoints or the ends of the main pits.

Further, a technique disclosed in JP60-36700A includes a first preliminary corrosion step using acid and a second anodizing step of treatment using a direct current with a high current density. Aluminum foil is subjected to an alternating current (AC) treatment and is corroded in the first preliminary corrosion step, and the aluminum foil is subjected to a direct current (DC) treatment in the second anodizing step, so that the aluminum foil is increased in electrostatic capacitance and mechanical strength.

However, according to the above-mentioned technique disclosed in JP7-272983A, in the middle etching step, an etching solution is used which includes at least one of a solution of neutral salt and a solution of acid salt solution. The solution of neutral salt contains at least one of three kinds of chlorine ions including sodium chloride, ammonium chloride, and potassium chloride. When DC etching is performed by using direct current in such an etching solution, in the case where direct current is simply supplied for a fixed time, a large amount of aluminum hydroxide gel is generated around the front ends of etching pits, and sub pits are formed in a vertical direction only on surfaces of the main pits formed in the first etching step. Hence, the above method hardly increases an effective surface area of aluminum foil.

Further, according to the technique disclosed in JP60-36700A, after aluminum foil is subjected to alternating current (AC) treatment and is corroded in the first preliminary corrosion step, the aluminum foil is subjected to a direct current (DC) treatment in the second anodizing step. In this case, although corrosion is surely accelerated, etching pits generated by the direct current treatment have uneven shapes. Thus, it is not possible to obtain a satisfactory electrostatic capacitance and mechanical strength.

Furthermore, according to the conventional technique for increasing an effective surface area of anode foil, in the middle etching step of forming the sub pits, which are branched from the surface layer to the ends of the main pits, on the main pits formed in the first etching step, as shown in FIG. 9, although a surface of aluminum foil 63 is not melted, many sub pits 62 branched from main pits 61 are formed on a surface layer of the aluminum foil 63. Thus, the anode foil cannot be increased in electrostatic capacitance. Here, FIG. 9 is a schematic diagram showing a cross section of etching pits formed by etching on the conventional aluminum foil 63.

DISCLOSURE OF THE INVENTION

The present invention is achieved to solve the above-mentioned conventional problems and has as its object the provision of an electrode foil for an aluminum electrolytic capacitor and a method of manufacturing the same, by which sub pits branched on a surface layer of an aluminum foil can be reduced with high mechanical strength and large electrostatic capacitance.

In order to attain the above object, the electrode foil for an aluminum electrolytic capacitor of the present invention is configured such that a large number of main pits are formed by etching from a surface of aluminum foil in a thickness direction on both surfaces of aluminum foil, and sub pits are branched from the vicinity of a surface layer other than the surface layer on the main pits to the ends of the main pits. With this configuration, sub pits branched on the surface layer of aluminum foil are not formed in the present invention, thereby increasing an electrostatic capacitance of the electrode foil for an aluminum electrolytic capacitor.

Further, in the electrode foil for an aluminum electrolytic capacitor of the present invention, the sub pits are shorter than the main pits. Such a configuration can increase mechanical strength of the electrode foil for an aluminum electrolytic capacitor of the present invention.

The method of manufacturing the electrode foil for an aluminum electrolytic capacitor of the present invention comprises a first etching step in which aluminum foil is dipped into an etching solution of an acidic aqueous solution containing hydrochloric acid and sulfuric acid and/or nitric acid and a direct current is supplied to form main pits, an middle etching step in which the direct current is supplied and etching is performed in an etching solution of neutral salt containing an additive therein to effectively form the sub pits branched from the midpoints or the ends of the main pits other than the surface layer on the main pits, and a final etching step of increasing the main pits and the sub pits in diameter. With this method, since the surface of the aluminum foil is covered with an oxide film, a large number of sub pits are formed in a depth direction of the main pits without forming the sub pits branched into the surface layer of the aluminum foil. Thus, it is possible to produce electrode foil for an aluminum electrolytic capacitor with high mechanical strength and a large electrostatic capacitance in a stable manner.

According to a method of manufacturing the electrode foil for an aluminum electrolytic capacitor of the present invention, in the above-mentioned manufacturing method, at least one or more additives are selected from oxalic acid, citric acid, phosphoric acid, boric acid, succinic acid, and malonic acid. Further, in the manufacturing method of the present invention, a concentration of the additive ranges from 0.01 to 1.0%. With this method, it is possible to obtain the effect of the manufacturing method more effectively.

According to a method of manufacturing the electrode foil for an aluminum electrolytic capacitor of the present invention, in the middle etching step of the above-mentioned manufacturing method, when a direct current is supplied and etching is performed, DC etching is performed while aluminum foil is passed through pairs of electrode plates in a plurality of etching tanks having a plurality of pairs of electrode plates, and a pair of electrode plates for supplying an alternating current is provided to perform AC etching at an upper or lower position of at least a pair of electrode plates among the plurality of electrode plates provided in the plurality of etching tanks. With this method, the surfaces of aluminum foil and etching pits are made rough by supplying an alternating current and a hydrated film is formed. Thus, it is possible to efficiently accelerate the formation of etching pits by using a direct current and to increase an effective surface area of aluminum foil.

According to a method of manufacturing the electrode foil for an aluminum electrolytic capacitor of the present invention, in the above-mentioned manufacturing method, a pair of electrode plates for supplying a direct current is always provided right after a pair of electrode plates for supplying an alternating current. According to the present invention, etching pits can be formed by using a direct current more efficiently than the effect of the above-mentioned manufacturing method.

According to a method of manufacturing the electrode foil for an aluminum electrolytic capacitor of the present invention, in the above-mentioned manufacturing method, a pair of electrode plates for supplying an alternating current partially interrupts a pair of electrode plates for supplying a direct current. The present invention can readily provide a pair of electrode plates for supplying an alternating current.

According to a method of manufacturing the electrode foil for an aluminum electrolytic capacitor of the present invention, in the above-mentioned manufacturing method, a pair of electrode plates for supplying an alternating current is 0.01 to 0.15 A/cm$^2$ in current density. The present invention can enhance the effects of the above-mentioned manufacturing method.

Additionally, when a pair of electrode plates for supplying an alternating current is less than 0.01 A/cm$^2$ in current density, it is not possible to make rough a surface of aluminum foil to form a hydrated film. When a current density exceeds 0.15 A/cm$^2$, the surface becomes too rough and a hydrated film is less likely to be formed.

According to a method of manufacturing the electrode foil for an aluminum electrolytic capacitor of the present invention, in the above-mentioned manufacturing method, in the first etching step and/or final etching step, etching is performed by supplying a direct current as follows: DC etching is performed while aluminum foil is passed through a pair of electrode plates in a plurality of etching tanks having a plurality of pairs of electrode plates, and DC etching is performed while an electrical insulating material partially interrupts at least a pair of electrode plates among the plurality of pairs of electrode plates provided in the plurality of etching tanks. The present invention can obtain a uniform current density in an electrolytic solution, so that etching pits formed on aluminum foil are equal in length. Further, it is possible to increase etching efficiency, thereby achieving a larger effective surface area of aluminum foil.

According to a method of manufacturing the electrode foil for an aluminum electrolytic capacitor of the present invention, in the above-mentioned manufacturing method, an electrical insulating material includes an opening composed of a plurality of holes or a plurality of slits. Hence, it is possible to obtain a more uniform current density in an electrolytic solution.

BRIEF DESCRIPTION OF THE DRAWINGS

FIG. 9 is a schematic diagram showing a cross section of etching pits of etching foil in conventional electrode foil for an aluminum electrolytic capacitor.

DESCRIPTION OF THE EMBODIMENTS (Embodiment 1)

Figure 1:
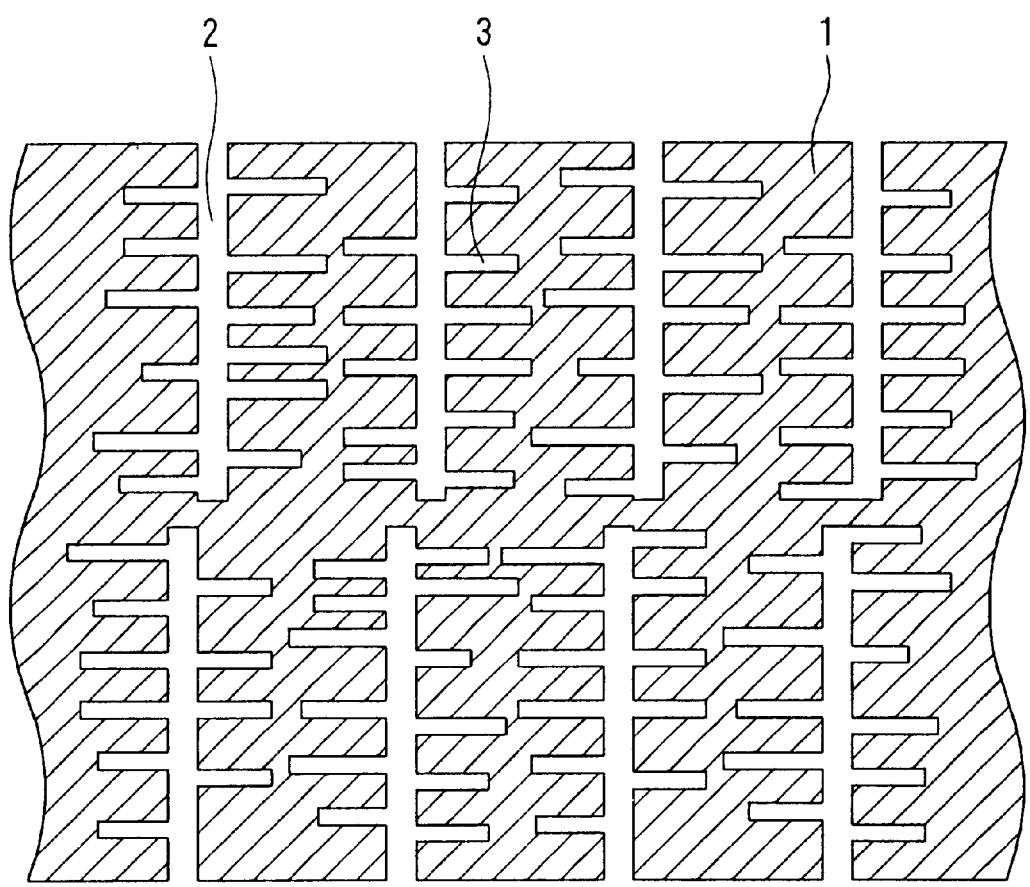
FIG. 1 is a schematic diagram showing a cross section of etching pits of an etching foil in an electrode foil for an aluminum electrolytic capacitor according to Embodiment 1 of the present invention.

FIG. 1 is a schematic diagram showing a cross section of etching pits on an etching foil provided in an electrode foil for an aluminum electrolytic capacitor. In FIG. 1, reference numeral 1 denotes an aluminum foil, reference numeral 2 denotes main pits extending in a thickness direction from a surface of the aluminum foil 1, and reference numeral 3 denotes sub pits branched from the vicinity of a surface layer other than the surface layer on the main pits 2 to ends of the main pits 2. Such a configuration of the etching foil can increase an electrostatic capacitance and mechanical strength of the electrode foil.

Figure 2:
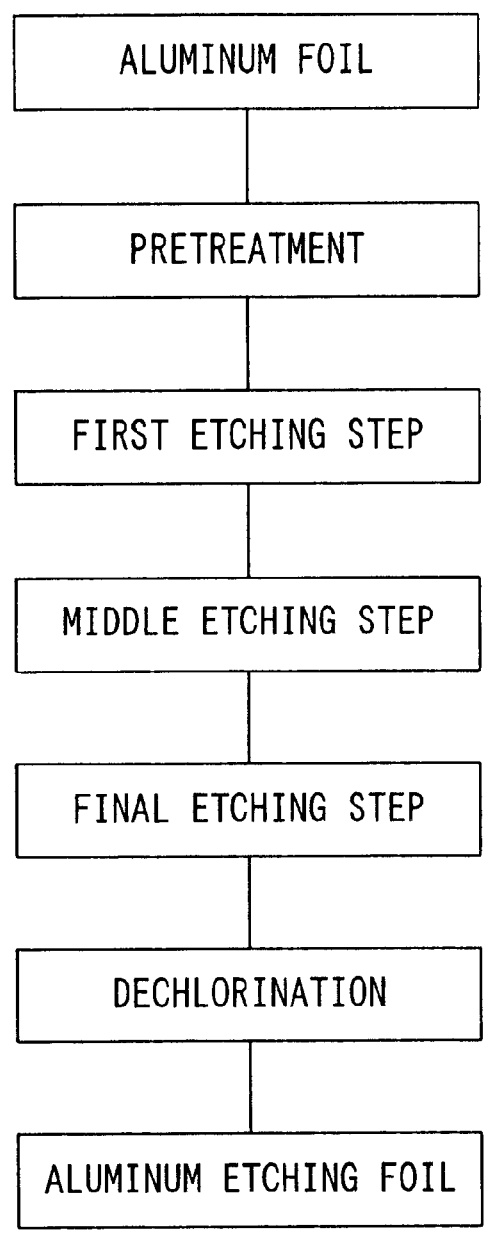
FIG. 2 is a flowchart showing etching steps of the etching foil according to Embodiment 1.

FIG. 2 is a flowchart showing etching steps of the etching foil. In FIG. 2, first, aluminum foil is prepared, and may be subjected to pretreatment in an acid solution, an alkali solution, or the like. In a first etching step, an important point is how to generate uniform main pits 2 in the aluminum foil 1 with increasing a density of the main pits. In order to attain the above object, etching is electrochemically performed by using an etching solution of an acidic aqueous solution, in which hydrochloric acid, sulfuric acid, and/or nitric acid are added.

A concentration of hydrochloric acid in the acidic aqueous solution preferably ranges from 2 to 15%. When a concentration is 2% or less, sufficient pits cannot be formed. When a concentration exceeds 15%, the surface of the aluminum foil is melted. A suitable range is 4 to 12%.

Moreover, a density of generated pits can be further increased by adding sulfuric acid and/or nitric acid. An amount of addition preferably ranges from 0.1 to 15.

A temperature of the above etching solution of an acid solution also considerably affects the generation of the main pits 2. When a temperature is below 50° C., a generating density of the main pits 2 is small. When a temperature exceeds 100° C., the surface of the aluminum foil 1 is melted. Thus, a temperature of the etching solution preferably ranges from 50 to 100° C.

Next, in a middle etching step, the sub pits 3 are formed perpendicularly to the main pits 2 formed in the first etching step to increase a density of etching pits.

The present invention regulates the formation of the sub pits 3 in the middle etching step. Namely, by performing etching on both surfaces of the aluminum foil 1, the sub pits 3 are provided on a large number of the main pits 2 provided from the surface in a thickness direction. The sub pits 3 are branched from the midpoints and the ends of the main pits 2 except for the surface layer on the main pits 2. Hence, it is possible to obtain the etching foil with high mechanical strength and a large electrostatic capacitance.

Moreover, the etching solution used in the middle etching step is prepared by adding at least an element selected from oxalic acid, citric acid, phosphoric acid, boric acid, succinic acid, and malonic acid to an aqueous solution of neutral salt such as sodium chloride, ammonium chloride, and potassium chloride. The above etching solution is used for etching. With the above method, it is possible to form the sub pits 3 which are branched from the midpoints and the ends of the main pits 2 except for the surface layer on the main pits 2.

A concentration of the solution of neutral salt preferably ranges from 0.5 to 10%. When a concentration is less than 0.5%, the growth of the sub pits 3 is small. When a concentration exceeds 10%, a thick oxide film is formed entirely on the surfaces of the main pits 2, thereby interfering with the formation of the sub pits 3. Further, a concentration of the above additive preferably ranges from 0.01 to 1.0%. When a concentration of the additive is less than 0.01%, the sub pits 3 are formed on the surface layer of the aluminum foil 1. When a concentration of the additive exceeds 1.0%, a forming density of the sub pits 3 is reduced.

A temperature of the above solution of neutral salt considerably affects the reaction with the aluminum foil 1. Below 70° C., the speed of etching reaction is reduced and etching is less readily performed. Above 95° C., the surface of the aluminum foil 1 is melted, and the sub pits 3 are less likely to be formed in a vertical direction, which is the object of the present invention. Therefore, a temperature of the etching solution preferably ranges from 70 to 95° C.

Besides, an intermediate treatment may be optionally performed before the middle etching step. The intermediate treatment removes an uneven film on the surface of the aluminum foil 1 after the first etching step and activates the surface of the aluminum foil 1.

As a solution used in the intermediate treatment, an acidic aqueous solution is used, which contains at least an element selected from hydrochloric acid, hydrogen fluoride, and nitric acid. The aluminum foil 1 on which the main pits 2 are formed in the first etching step is dipped into the solution. An oxygen concentration of the acidic aqueous solution preferably ranges from 2 to 10%. When an oxygen concentration is below 2%, a film is not sufficiently removed. When an oxygen concentration exceeds 10%, the surface of the aluminum foil 1 is melted. Further, a temperature of the acidic aqueous solution preferably ranges from 50 to 90° C.

Subsequently, in a final etching step, the main pits 2 and the sub pits 3 that are formed in the first etching step and the middle etching step are increased in a diameter while the melting of the surface of the aluminum foil 1 is suppressed.

As an etching solution used for the final etching step, it is preferable to adopt an etching solution prepared by adding at least an element selected from oxalic acid, chromic acid, acetic acid, phosphoric acid, citric acid, and boric acid to sulfuric acid or nitric acid. Also, a concentration of the etching solution preferably ranges from 0.1 to 5.0%. When a concentration is below 0.1%, the surface of the aluminum foil 1 is melted. When a concentration exceeds 5.0%, a too large oxide film is formed on the surface of the aluminum foil 1, so that the bits are less likely to increase in diameter.

According to the above-mentioned method of manufacturing the etching foil, when the sub pits 3 are formed in the middle etching step, by performing etching in an aqueous solution of neutral salt where an additive is added, oxide films are formed with different thicknesses on the surfaces of the aluminum foil 1 and the main pits 2. Thus, it is possible to generate a large number of sub pits 3 branched from the midpoints and the ends of the main pits 2 except for the surface layer on the main pits 2. Therefore, it is possible to produce etching foil in a stable manner with high mechanical strength and a large electrostatic capacitance.

Hereunder, Embodiment 1 will be discussed in detail in accordance with the following examples.

EXAMPLE 1

First, aluminum foil 1 with a purity of 99.98% and a thickness of 100 μm was used.

Subsequently, as a first etching step, the aluminum foil 1 was dipped into an etching solution of an acidic aqueous solution (hydrochloric acid concentration of 10%, sulfuric acid concentration of 10%) at 85° C., etching was performed while direct current having a current density of 20 A/dm$^2$ was supplied for 250 seconds, and main pits 2 were formed.

And then, as intermediate treatment, the aluminum foil 1 was dipped into an aqueous solution of sulfuric acid having a temperature of 40° C. and a concentration of 0.5% for 60 seconds.

Next, as a middle etching step, the aluminum foil 1 was dipped into an aqueous solution of neutral salt (3.0% of sodium chloride, 0.1% of oxalic acid) at 70° C., etching was performed while direct current having a current density of 15 A/dm² was supplied for 250 seconds, and sub pits 3 were formed.

And then, as a final etching step, the aluminum foil 1 was dipped into an aqueous solution of nitric acid having a temperature of 70° C. and a concentration of 3%, direct current with a current density of 10 A/dm² is supplied for 600 seconds, the main pits and the sub pits were increased in diameter, and finally as dechlorination, the aluminum foil 1 was cleaned for one minute in an aqueous solution of nitric acid having a temperature of 50° C. and a concentration of 10% so as to form etching foil.

EXAMPLE 2

An etching foil was formed in the same manner as Example 1 except that the aqueous solution of neutral salt used in the middle etching step of Example 1 was replaced with an aqueous solution of neutral salt that contained 3.0% of potassium chloride and 0.1% of oxalic acid.

EXAMPLE 3

An etching foil was formed in the same manner as Example 1 except that the aqueous solution of neutral salt used in the middle etching step of Example 1 was replaced with an aqueous solution of neutral salt that contained 3.0% of ammonium chloride and 0.1% of oxalic acid.

EXAMPLE 4

An etching foil was formed in the same manner as Example 1 except that the aqueous solution of neutral salt used in the middle etching step of Example 1 was replaced with an aqueous solution of neutral salt that contained 3.0% of ammonium chloride and 0.2% of boric acid.

EXAMPLE 5

An etching foil was formed in the same manner as Example 1 except that the aqueous solution of neutral salt used in the middle etching step of Example 1 was replaced with an aqueous solution of neutral salt that contained 3.0% of ammonium chloride and 0.1% of phosphoric acid.

EXAMPLE 6

An etching foil was formed in the same manner as Example 1 except that the aqueous solution of neutral salt used in the middle etching step of Example 1 was replaced with an aqueous solution of neutral salt that contained 3.0% of ammonium chloride and 0.3% of citric acid.

EXAMPLE 7

An etching foil was formed in the same manner as Example 1 except that the aqueous solution of neutral salt used in the middle etching step of Example 1 was replaced with an aqueous solution of neutral salt that contained 3.0% of ammonium chloride and 1.0% of succinic acid.

EXAMPLE 8

An etching foil was formed in the same manner as Example 1 except that the aqueous solution of neutral salt used in the middle etching step of Example 1 was replaced with an aqueous solution of neutral salt that contained 3.0% of ammonium chloride and 0.005, 0.01, 0.05, 0.1, 0.5, 1.0, and 1.5% of succinic acid.

EXAMPLE 9

An etching foil was formed in the same manner as Example 1 except that the acidic aqueous solution used in the first etching step of Example 1 was replaced with an etching solution that contained 10% of hydrochloric acid and 10% of nitric acid.

COMPARATIVE EXAMPLE 1

An etching foil was formed in the same manner as Example 1 except that the aqueous solution of neutral salt used in the middle etching step of Example 1 was replaced with an aqueous solution of neutral salt that contained 3.0% of sodium chloride (no additive).

Regarding the etching foil of Examples 1 to 9 and Comparative Example 1 of the present invention, chemical conversion coating was performed at 500V in an aqueous solution of boric acid with a temperature of 90° C. and a concentration of 8%, and an electrostatic capacitance and bending strength (one reciprocation is counted as a single time with a thickness of φ1.0 mm, a load of 50 g, and a bending angle of 90°) were measured for each of test samples. The results are shown in Table 1.

TABLE 1

| | | TEST RESULTS | |
|---|---|---|---|
| | | ELECTROSTATIC CAPACITANCE ($\mu$F/cm²) | MECHANICAL STRENGTH (BENDING STRENGTH TIMES) |
| EXAMPLE 1 | | 0.53 | 25 |
| EXAMPLE 2 | | 0.51 | 24 |
| EXAMPLE 3 | | 0.54 | 25 |
| EXAMPLE 4 | | 0.53 | 25 |
| EXAMPLE 5 | | 0.52 | 24 |
| EXAMPLE 6 | | 0.52 | 23 |
| EXAMPLE 7 | | 0.53 | 24 |
| EXAMPLE 8 | 0.005 | 0.49 | 31 |
| | 0.01 | 0.51 | 27 |
| | 0.05 | 0.53 | 26 |
| | 0.1 | 0.54 | 24 |
| | 0.5 | 0.55 | 23 |
| | 1.0 | 0.55 | 21 |
| | 1.5 | 0.48 | 15 |
| EXAMPLE 9 | | 0.52 | 24 |
| COMPARATIVE EXAMPLE 1 | | 0.46 | 13 |

As shown in Table 1, the etching foil of Examples 1 to 9 of the present invention includes the sub pits 3, which were branched from the midpoints and the ends of the main pits 2 except for the surface layer on the main pits 2, on the large number of main pits 2 formed by etching in a thickness direction on both surfaces of the aluminum foil 1. Thus, it is possible to obtain etching foil with a larger electrostatic capacitance and higher mechanical strength as compared with the etching foil of Comparative Example 1.

In Examples 1 to 7, sodium chloride, potassium chloride, and ammonium chloride were used as an aqueous solution of neutral salt. The present invention is not limited to the above solution.

Further, according to Example 8, an amount of additive which was added to an aqueous solution of neutral salt was set at 0.01 to 1.0%. Thus, it is possible to obtain etching foil with a large electrostatic capacitance and high mechanical strength.

Furthermore, the same characteristics as Example 1 can be obtained when the acid aqueous solution of the first etching step is replaced with an etching solution using hydrochloric acid and nitric acid.

(Embodiment 2)

According to Embodiment 2, in the middle etching step of Embodiment 1, a pair of electrode plates for supplying alternating current is provided for AC etching at an upper or lower position of at least a pair of electrode plates among a plurality of pairs of electrode plates provided in an etching tank. Thus, it is possible to obtain equal lengths of main pits in a first etching step. Further, it is possible to evenly form sub pits branched from the midpoints and the ends of the main pits in a middle etching step. Moreover, it is possible to form the main pits and the sub pits with equal diameters in a final etching step. Thus, it is possible to increase an effective surface area of aluminum foil.

Besides, in the first etching step and/or the final etching step, a pair of electrode plates for supplying direct current partially interrupts direct current supplied between the aluminum foil and the pair of electrode plates by using an electrical insulating material. Thus, since a current density in an electrolytic solution can be uniform, etching pits can be formed with uniform lengths on the aluminum foil. Moreover, since etching efficiency can be also improved, an effective surface area of the aluminum foil can be further increased. As a result, it is possible to obtain etching foil with a large electrostatic capacitance and high mechanical strength.

Hereunder, Embodiment 2 will be discussed in accordance with specific examples.

EXAMPLE 10

Pretreatment was performed by dipping aluminum foil with a purity of 99.98% and a thickness of 100 µm into an aqueous solution of 0.5% NaOH for one minute.

Figure 3:
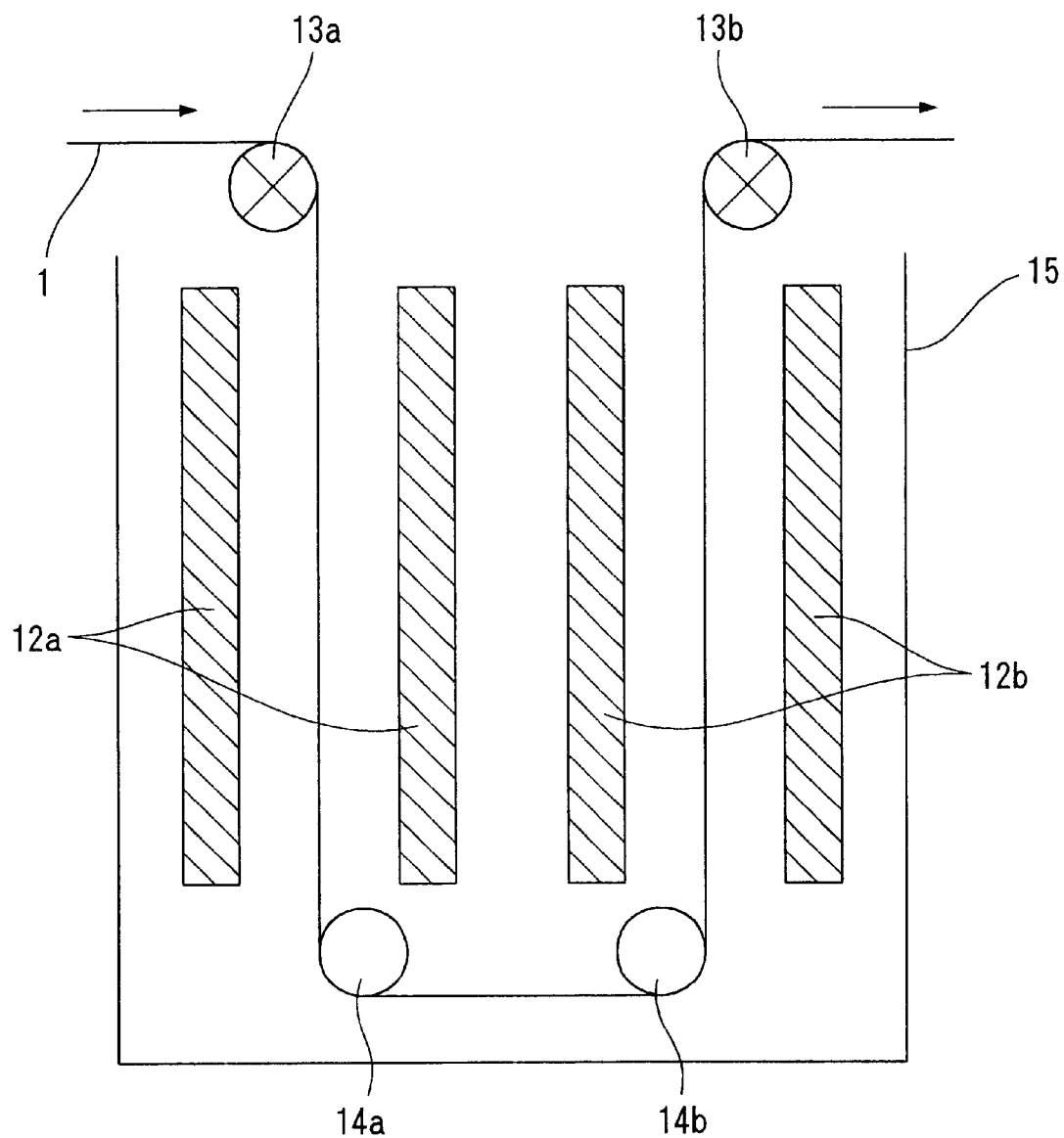
FIG. 3 is a sectional view showing an etching tank on a previous step and a subsequent step that is used in Example 10 of Embodiment 2.

Subsequently, in a first etching step, two etching tanks 15 shown in FIG. 3 were used for continuously performing DC etching on aluminum foil 1. In FIG. 3, reference numeral 1 denotes aluminum foil, reference numerals 12a and 12b denote pairs of electrode plates disposed so as to be opposed to the aluminum foil 1, reference numerals 13a and 13b denote current supply rollers for feeding a current to the aluminum foil 1, reference numerals 14a and 14b denote inter-tank rollers disposed in the etching tank 15, and arrows indicate a direction of conveying the aluminum foil 1.

Figure 4A:
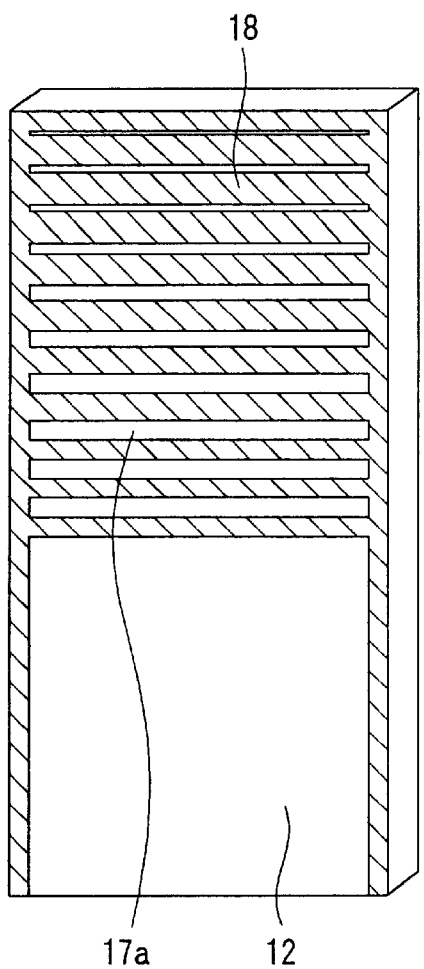
FIG. 4(A) is a perspective view showing a configuration of an electrode plate according to Example 10 of Embodiment 2.

Further, the pairs of electrode plates 12a and 12b were configured as shown in FIG. 4(A). In FIG. 4(A), reference numeral 12 denotes an electrode plate. The upper part and the central part of the electrode plate 12 was covered with an electrical insulating material 18, on which slits 17a were partially formed in a horizontal direction, and the electrode plate 12 was exposed on the lower part other than the sides. As for the slits 17a, the lower slits were larger in width than the upper slits, and the lower slits were smaller in interval.

When the aluminum foil 1 was etched in the etching tank 15, first, the aluminum foil 1 was dipped into an electrolytic solution (not shown) via the current supply rollers 13a and were subjected to direct current etching between the pairs of electrode plates 12a disposed so as to be opposed to the aluminum foil 1 in the electrolytic solution. And then, the aluminum foil 1 passed through the inter-tank rollers 14a and 14b, current was passed to the aluminum foil 1 again from the current supply roller 13b, and the aluminum foil was subjected to DC etching between the pair of electrode plates 12b disposed so as to be opposed to the aluminum foil 1. Hence, the aluminum foil 1 was continuously provided on which main pits 2 are formed.

As the electrolytic solution used in the first etching step, an electrolytic solution was used, which was prepared by adding 1% sulfuric acid to 10% hydrochloric acid at 85° C. Direct current with a current density of 2000 A/cm$^2$ was supplied to the pair of electrode plates 12a and 12b to perform DC etching, and then, the electrode plates 12a and 12b were cleaned with water.

Figure 5:
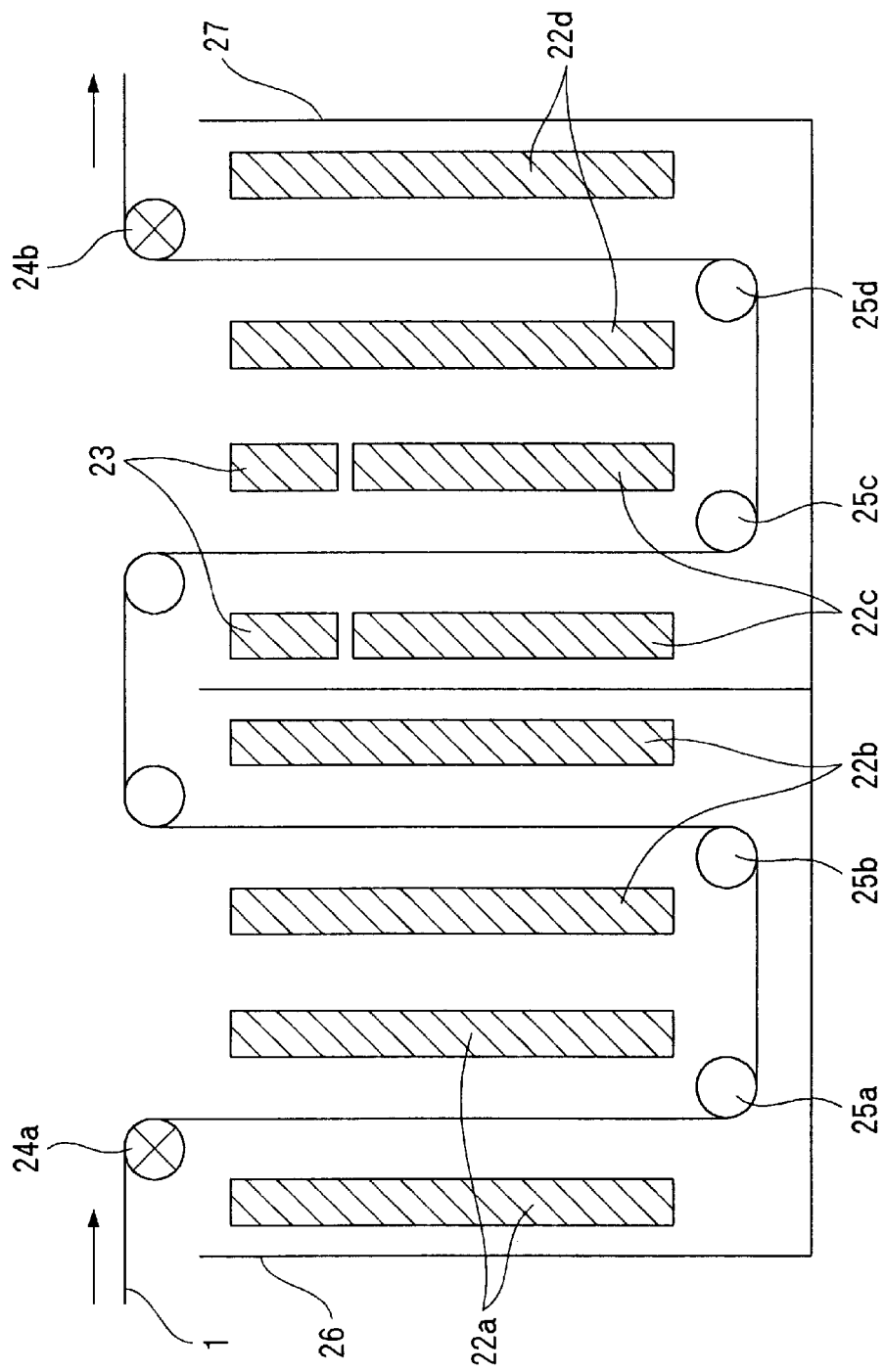
FIG. 5 is a sectional view showing an intermediate-step etching tank used in Example 10 of Embodiment 2.

Subsequently, in a middle etching step, the aluminum foil was continuously subjected to DC etching using etching tanks shown in FIG. 5. Two etching tanks were provided. Electrode plates 22 and 23 were disposed in parallel in the tanks 26 and 27, and aluminum foil 1 passed through the electrode plates while meandering. In FIG. 5, reference numerals 22a, 22b, 22c, and 22d denote pairs of electrode plates that were disposed so as to be opposed to the aluminum foil 1, reference numerals 24a and 24b denote current supply rollers for feeding a current to the aluminum foil 1, reference numerals 25a, 25b, 25c, and 25d denote inter-tank rollers disposed in the etching tanks 26 and 27, reference numeral 23 denotes a pair of electrode plates for supplying alternating current, and arrows indicate a direction of conveying the aluminum foil 1.

Besides, the pairs of electrode plates 22a, 22b, 22c, and 22d that were opposed to the aluminum foil 1 were each configured as shown in FIG. 4(A).

In the above described etching tank 26, the aluminum foil 1 was etched as follows: first, the aluminum foil 1 was dipped into an electrolytic solution (not shown) via the current supply roller 24a and was subjected to DC etching between the pair of electrode plates 22a opposed to the aluminum foil 1 in the electrolytic solution. And then, the aluminum foil 1 passed by the inter-tank rollers 25a and 25b and was subjected to direct current etching again between the pair of electrode plates 22b opposed to the aluminum foil 1. The aluminum foil 1 was shifted to the etching tank 27 and was subjected to alternating current etching between the pair of electrode plates 23 where alternating current was supplied. Subsequently, the aluminum foil 1 was subjected to DC etching between the pair of electrode plates 22c, and then, the aluminum foil 1 passed by the inter-tank rollers 25c and 25d and was subjected to direct current etching again between the pair of electrode plates 22d opposed to the aluminum foil 1.

As the electrolytic solution used in the middle etching step, an electrolytic solution was used which was an aqueous solution of neutral salt containing 3% ammonium chloride at 90° C. Direct current with a current density of 1200 A/cm$^2$ was supplied to the pair of electrode plates 22a and 22c, and direct current with a current density of 600 A/cm$^2$ was supplied to the pair of electrode plates 22b and 22d. Further, alternating current with a sine wave having a frequency of 20 Hz and a current density of 0.1 A/cm$^2$ was supplied to the pair of electrode plates 23, and etching was performed. And then, the aluminum foil 1 was cleaned with water.

Subsequently, in a final etching step, two etching tanks 15 of FIG. 3 were used for continuously performing DC etching on the aluminum foil 1.

As an electrolytic solution used in the final etching step, an electrolytic solution was used in which 0.5% boric acid was added to an aqueous solution of 5% nitric acid at 50° C. A direct current with a current density of 1000 A/cm$^2$ was supplied to the pair of electrode plates 12a and 12b to perform DC etching, and then, the aluminum foil 1 was washed with water. Finally, dechlorination was performed to form etching foil.

EXAMPLE 11

Figure 4B:
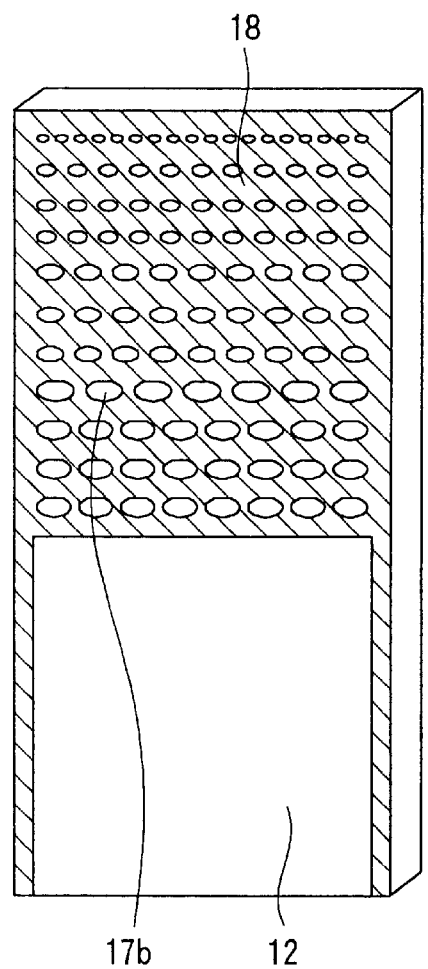
FIG. 4(B) is a perspective view showing a configuration of an electrode plate according to Examples 6 to 12 of Embodiment 2.

An etching foil was formed in the same manner as Example 10 except that the pairs of electrode plates 22a, 22b, 22c, and 22d were each configured as shown in FIG. 4(B). The electrode plates were opposed to the aluminum foil 1 in the first etching step of Example 10. The upper part and the central part of the electrode plate of FIG. 4(B) were covered with an electrical insulating material 18 on which oval holes 17b were formed in an array. An electrode plate 16 was exposed on the lower part other than the sides. The holes 17b were small on the upper part and large on the lower part. The holes on the lower part had smaller intervals in a vertical direction.

EXAMPLE 12

Figure 6:
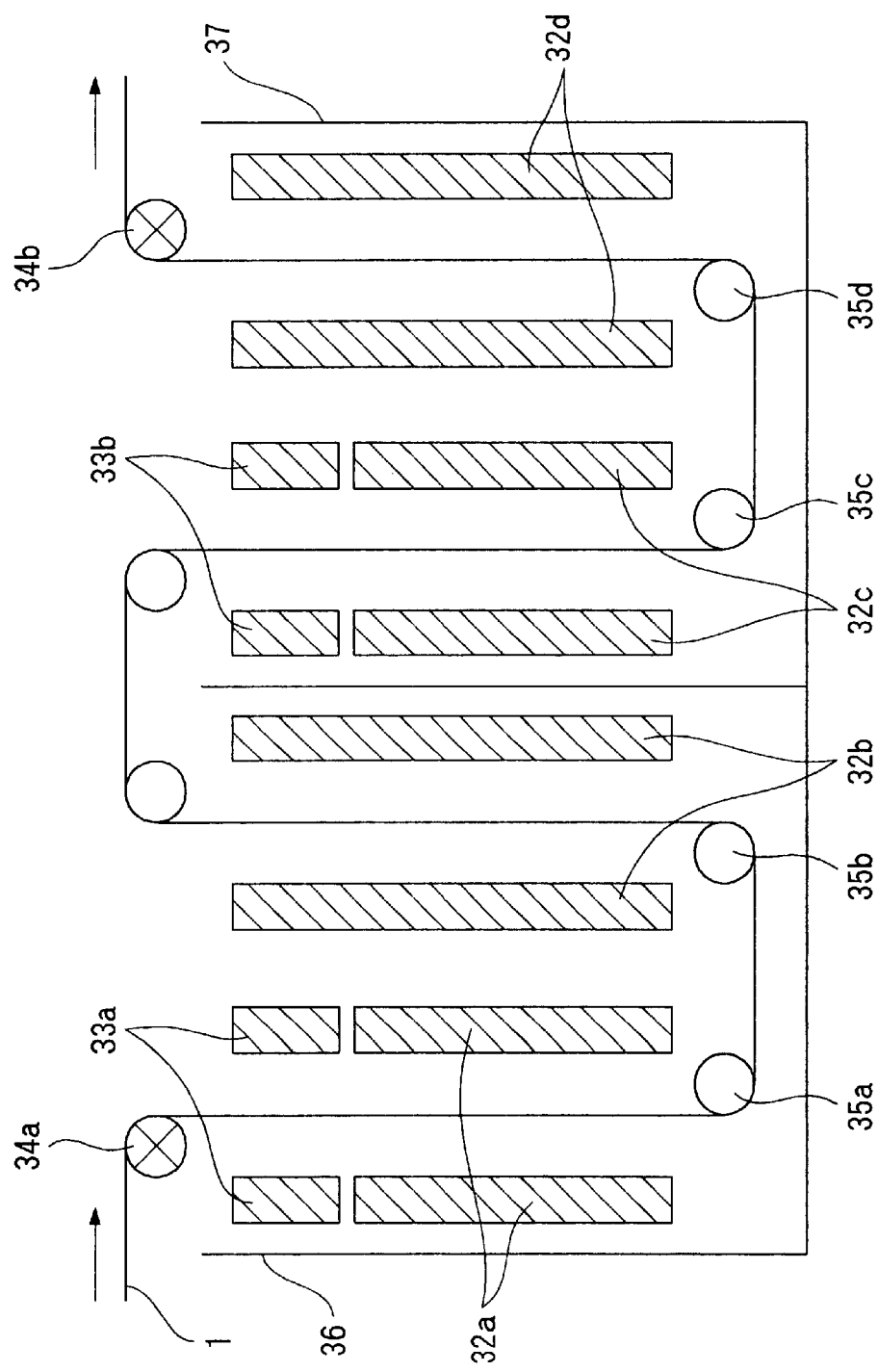
FIG. 6 is a sectional view showing an intermediate-step etching tank used in Example 11 of Embodiment 2.

In Example 12, an etching foil was formed in the same manner as Example 10 except that aluminum foil 1 was continuously subjected to DC etching using etching tanks of FIG. 6 in the middle etching step of Example 10.

In FIG. 6, reference numerals 32a, 32b, 32c, and 32d denote pairs of electrode plates disposed so as to be opposed to the aluminum foil 1, reference numerals 34a and 34b denote current supply rollers for feeding a current to the aluminum foil 1, reference numerals 35a, 35b, 35c, and 35d denote inter-tank rollers disposed in etching tanks 36 and 37, reference numerals 33a and 33b denote pairs of electrode plates for supplying alternating current, and arrows indicate a direction of conveying the aluminum foil 1.

The present example is characterized in that the electrode plates 33a for supplying alternating current are provided in the etching tank 36 as well.

Besides, alternating current with a sine wave having a frequency of 20 Hz and a current density of 0.1 A/cm² was supplied to the pairs of electrode plates 33a and 33b for supplying alternating current.

EXAMPLE 13

Figure 7:
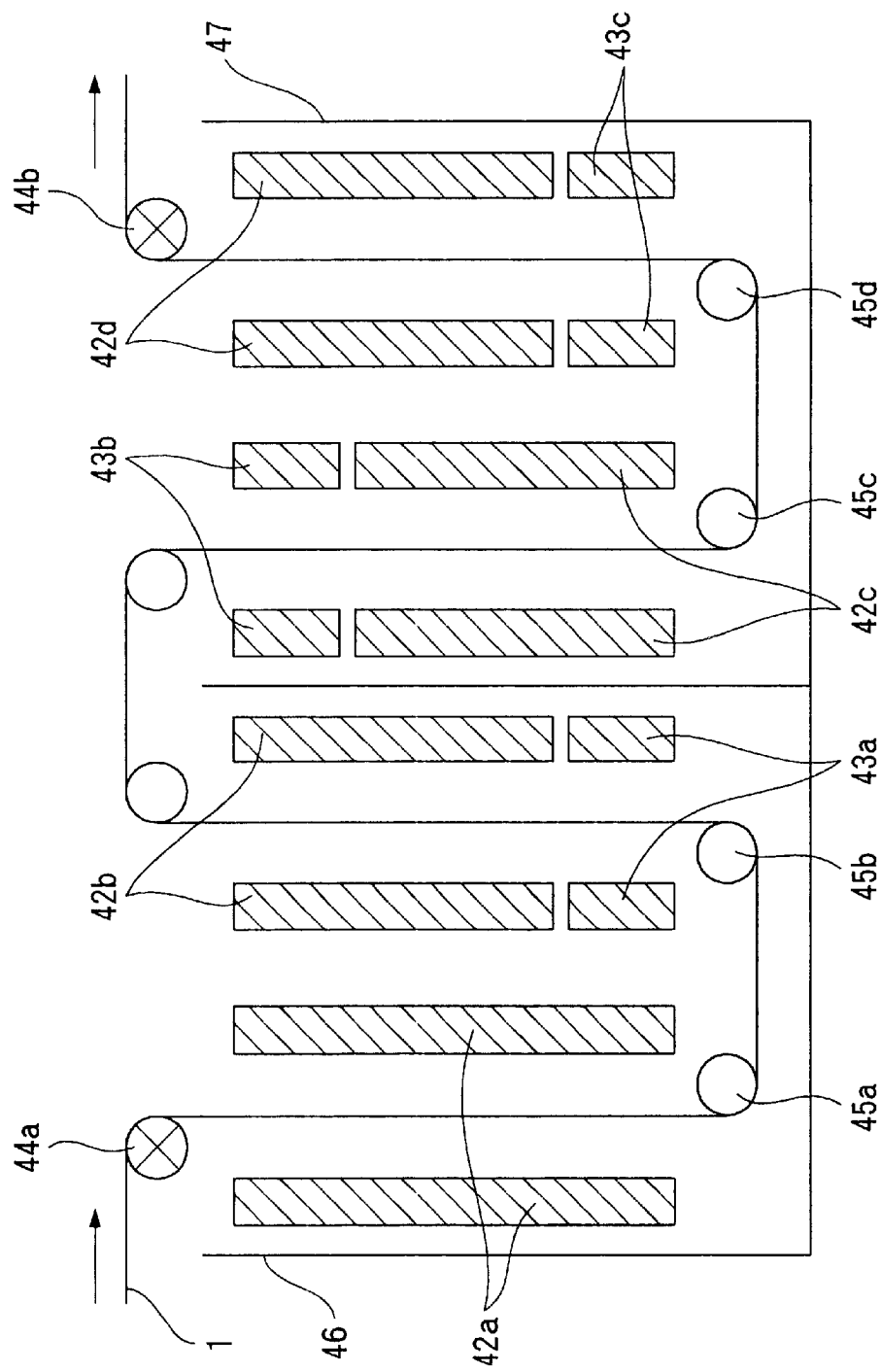
FIG. 7 is a sectional view showing an intermediate-step etching tank used in Example 12 of Embodiment 2.

In Example 13, an etching foil was formed in the same manner as Example 10 except that aluminum foil 1 was continuously subjected to direct current etching by using etching tanks of FIG. 7 in the middle etching step of Example 10.

In FIG. 7, reference numerals 42a, 42b, 42c, and 42d denote pairs of electrode plates disposed so as to be opposed to the aluminum foil 1, reference numerals 44a and 44b denote current supply rollers for feeding a current to the aluminum foil 1, reference numerals 45a, 45b, 45c, and 45d denote inter-tank rollers disposed in etching tanks 46 and 47, reference numerals 43a, 43b, and 43c denote pairs of electrode plates for supplying alternating current, and arrows indicate a direction of conveying the aluminum 1.

In Example 13, the pair of electrode plates 43a for supplying alternating current was disposed in the etching tank 46, and the electrode plates 43b and 43c were disposed in the etching tank 47. Additionally, the electrode plates 43a, 43b, and 43c were disposed alternately in a vertical direction.

Also, an alternating current with a sine wave having a frequency of 20 Hz and a current density of 0.1 A/cm² was supplied to the pairs of electrode plates 43a, 43b, and 43c for supplying alternating current.

EXAMPLE 14

Figure 8:
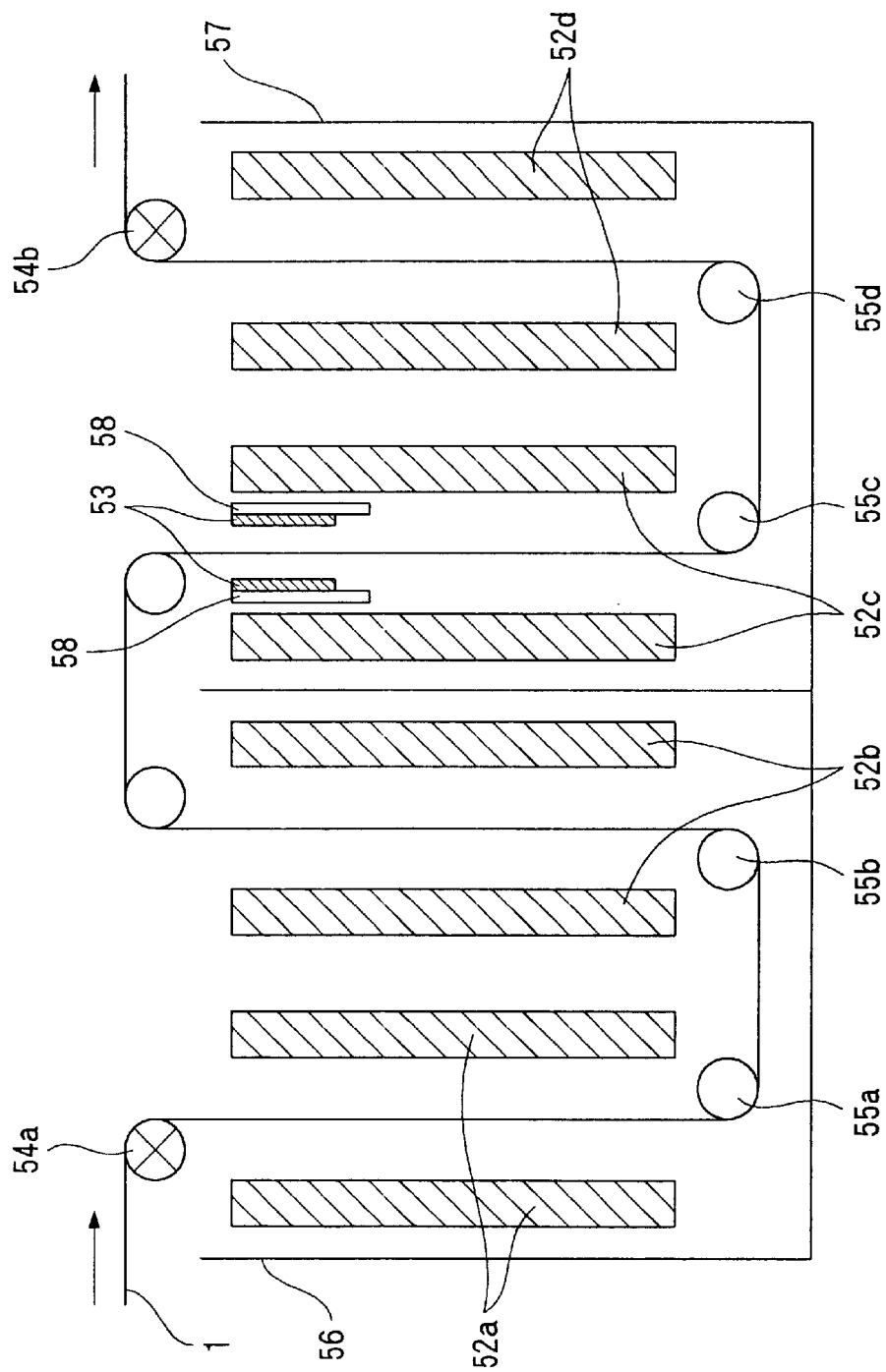
FIG. 8 is a sectional view showing an intermediate-step etching tank used in Example 13 of Embodiment 2.

In Example 14, an etching foil was formed in the same manner as Example 10 except that aluminum foil 1 was continuously subjected to direct current etching using etching tanks of FIG. 8 in the middle etching step of Example 10.

In FIG. 7, reference numerals 52a, 52b, 52c, and 52d denote pairs of electrode plates disposed so as to be opposed to the aluminum foil 1, reference numerals 54a and 54b denote current supply rollers for feeding a current to the aluminum foil 1, reference numerals 55a, 55b, 55c, and 55d denote inter-tank rollers disposed in etching tanks 56 and 57, and reference numeral 53 denotes a pair of electrode plates for supplying alternating current. Insulating plates 58 for interrupting direct current are provided on the backs of the electrode plates. Arrows indicate a direction of conveying the aluminum foil 1.

A plurality of pairs of the electrode plates 53 may be provided for supplying alternating current. The electrodes may be vertically arranged as the electrode plates 33a, 33b, 43a, 43b, and 43c of FIGS. 6 and 7.

Besides, an aluminum foil was formed by supplying alternating current with a sine wave having a frequency 15 Hz and current densities of 0.005, 0.01, 0.05, 0.1, 0.15, and 0.2 A/cm² to the pair of electrode plates 53 for supplying alternating current.

EXAMPLE 15

In Example 15, an etching foil was formed in the same manner as Example 10 except that the pairs of electrode plates 12a and 12b, which were opposed to the aluminum foil 1 in the first etching step of Example 10, were each configured as shown in FIG. 4(B), and the pairs of electrode plates 12a and 12b, which were opposed to the aluminum foil 1 in the final etching step, were also configured as shown in FIG. 4(B).

COMPARATIVE EXAMPLE 2

In Comparative Example 2, an etching foil was formed in the same manner as Example 10 except that the aluminum foil 1 was continuously subjected to DC etching by using two etching tanks 15 (no alternating current was supplied) of FIG. 3 in the middle etching step of Example 10.

Additionally, pairs of electrode plates 12a and 12b for supplying direct current did not include an electrical insulating material 18 for partially interrupting direct current.

Regarding the aluminum foil of Examples 10 to 15 and Comparative Example 2, an anodizing process was performed at a voltage of 280V in an aqueous solution of 8% boric acid at a temperature of 90° C., and then, an electrostatic capacitance and bending strength (one reciprocation is counted as a single time with a thickness of φ0.1 mm, a load of 50 g, and a bending angle of 90°) were measured for each of test samples. The results are shown in Table 2.

TABLE 2

|  | ELECTROSTATIC CAPACITANCE ($\mu F/cm^2$) | MECHANICAL STRENGTH (BENDING STRENGTH TIMES) |
|---|---|---|
| EXAMPLE 10 | 1.58 | 41 |
| EXAMPLE 11 | 1.59 | 42 |
| EXAMPLE 12 | 1.65 | 40 |
| EXAMPLE 13 | 1.68 | 39 |
| EXAMPLE 14  0.005 (Å/cm²) | 1.42 | 30 |
| 0.01 (Å/cm²) | 1.48 | 35 |
| 0.05 (Å/cm²) | 1.55 | 36 |
| 0.1 (Å/cm²) | 1.61 | 39 |
| 0.15 (Å/cm²) | 1.57 | 42 |
| 0.2 (Å/cm²) | 1.50 | 38 |
| EXAMPLE 15 | 1.60 | 40 |
| COMPARATIVE EXAMPLE 2 | 1.40 | 30 |

As shown in Table 2, the etching foil of Examples 10 to 15 of the present invention can be larger in effective surface area of the aluminum foil as compared with etching foil of Comparative Example 2. Consequently, it is possible to obtain etching foil with a large electrostatic capacitance and high mechanical strength.

As described above, according to the present invention, a large number of main pits are provided by etching on both surfaces of aluminum foil in a thickness direction from the surface, and sub pits are branched from the vicinity of a surface layer other than the surface layer on the main pits to the ends of the main pits. Thus, the branched sub pits are not formed on the surface layer of the aluminum foil. Hence, it is possible to increase a density of sub pits effectively for an electrostatic capacitance.

The manufacturing method is a method of manufacturing anode foil used for an aluminum electrolytic capacitor. According to the method, an aluminum foil is passed through pairs of electrode plates in a plurality of etching tanks including a plurality of pairs of electrode plates, and DC etching is performed. At an upper or lower position of at least a pair of electrode plates among the plurality of pairs of electrode plates provided in the plurality of etching tanks, a pair of electrode plates are provided for supplying alternating current to perform AC etching. With the above manufacturing method, when a direct current is supplied to form pits, an alternating current is supplied so as to form a hydrated film on the surface of the aluminum foil. Thus, since the pits can be formed more efficiently by the direct current, the aluminum foil can be increased in an effective surface area. Consequently, it is possible to obtain an anode foil for an aluminum electrolytic capacitor with a large electrostatic capacitance and high mechanical strength.

What is claimed is:

1. A method of manufacturing an electrode foil for an aluminum electrolytic capacitor, comprising:

a first etching step in which an aluminum foil is immersed in an etching solution of an acidic aqueous solution containing hydrochloric acid and sulfuric acid and/or nitric acid, and supplied with direct current, thereby to form main pits;

a middle etching step in which an etching is performed by using an etching solution of neutral salt containing an additive, and by supplying a direct current, thereby to effectively form sub pits branched away from the main pits at midpoints or inner ends thereof except at a surface layer portion thereof; and a final etching step for increasing the main pits and the sub pits in diameter.

2. The method of manufacturing an electrode foil for an aluminum electrolytic capacitor according to claim 1, wherein at least one or more additives are selected from chromic acid, oxalic acid, citric acid, phosphoric acid, boric acid, succinic acid, and malonic acid.

3. The method of manufacturing an electrode foil for an aluminum electrolytic capacitor according to claim 1, wherein the additive has a concentration of 0.01 to 1.0%.

4. The method of manufacturing an electrode foil for an aluminum electrolytic capacitor according to claim 1, wherein in the middle etching step, when etching is performed by supplying a direct current, DC etching is performed by passing the aluminum foil through a pair of electrode plates in a plurality of etching tanks each having a plurality of pairs of electrode plates, and AC etching is performed by providing a pair of electrode plates for supplying an alternating current at an upper or lower position of at least a pair of electrode plates among a plurality of pairs of electrode plates provided in the plurality of etching tanks.

5. The method of manufacturing an electrode foil for an aluminum electrolytic capacitor according to claim 4, wherein a pair of electrode plates for supplying a direct current is provided immediately after the pair of electrode plates for supplying an alternating current.

6. The method of manufacturing an electrode foil for an aluminum electrolytic capacitor according to claim 4, wherein the pair of electrode plates for supplying an alternating current is provided to partially interrupt a pair of electrode plates for supplying a direct current.

7. The method of manufacturing an electrode foil for an aluminum electrolytic capacitor according to claim 4, wherein the pair of electrode plates for supplying an alternating current is 0.01 to 0.15 A/cm$^2$ in current density.

8. The method of manufacturing an electrode foil for an aluminum electrolytic capacitor according to claim 1, wherein in the first etching step and/or final etching step, etching is performed by supplying a direct current such that DC etching is performed by passing the aluminum foil through a pair of electrode plates in a plurality of etching tanks each having a plurality of pairs of electrode plates, and DC etching is performed while an electrical insulating material partially interrupts at least a pair of electrode plates among the plurality of pairs of electrode plates provided in the plurality of etching tanks.

9. The method of manufacturing an electrode foil for an aluminum electrolytic capacitor according to claim 8, wherein the electrical insulating material includes an opening composed of a plurality of holes or a plurality of slits.

* * * * *